(12) United States Patent
Watanabe et al.

(10) Patent No.: US 7,067,806 B2
(45) Date of Patent: Jun. 27, 2006

(54) SCANNING PROBE MICROSCOPE AND SPECIMEN OBSERVATION METHOD

(75) Inventors: Masahiro Watanabe, Tokyo (JP); Toshihiko Nakata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/077,904

(22) Filed: Mar. 11, 2005

(65) Prior Publication Data

US 2005/0151077 A1   Jul. 14, 2005

Related U.S. Application Data

(62) Division of application No. 10/340,517, filed on Jan. 9, 2003, now Pat. No. 6,877,365.

(30) Foreign Application Priority Data

Nov. 9, 2002   (JP) ............................. 2002-001904

(51) Int. Cl.
*G01N 13/16* (2006.01)
*G01B 5/28* (2006.01)
(52) U.S. Cl. ...................... 250/306; 250/307; 250/310; 73/105
(58) Field of Classification Search ...................... None
See application file for complete search history.

(56) References Cited

U.S. PATENT DOCUMENTS

| | | | | |
|---|---|---|---|---|
| 5,672,816 A | * | 9/1997 | Park et al. ...................... 73/105 |
| 6,583,411 B1 | * | 6/2003 | Altmann et al. ............. 250/306 |
| 6,877,365 B1 | * | 4/2005 | Watanabe et al. ............. 73/105 |

* cited by examiner

*Primary Examiner*—Nikita Wells
(74) *Attorney, Agent, or Firm*—Townsend and Townsend and Crew LLP

(57) ABSTRACT

In order to provide a scanning probe microscope capable of measuring with high throughput distribution information relating to local characteristics of a sample concurrently with accurate three-dimensional shape information of the sample without damaging the sample, the speed of approach to each measurement location is increased by controlling the approach of the sample and probe by the provision of a high-sensitivity proximity sensor of the optical type. Also, additional information relating to the distribution of material quality on the sample can be obtained without lowering the scanning speed by: applying a voltage to the probe, or measuring the response on vibrating the probe, or detecting the local optical intensity of the sample surface concurrently with obtaining sample height data and concurrently with the contact period with the sample, whilst ensuring that the probe is not dragged over the sample, by bringing the probe into contact with the sample intermittently.

8 Claims, 10 Drawing Sheets

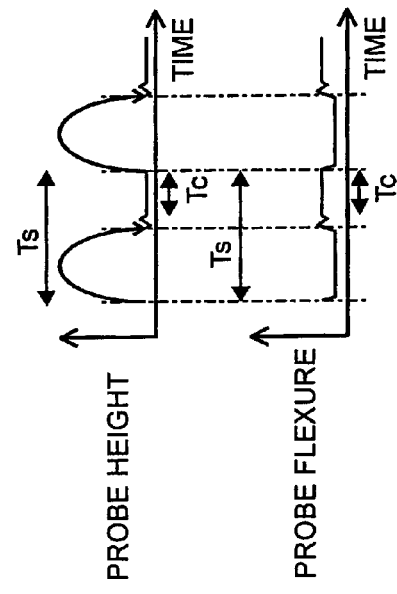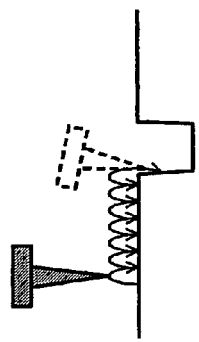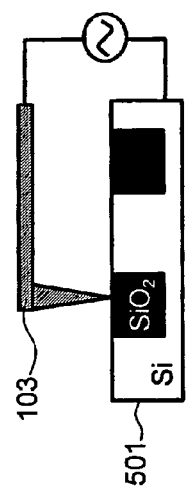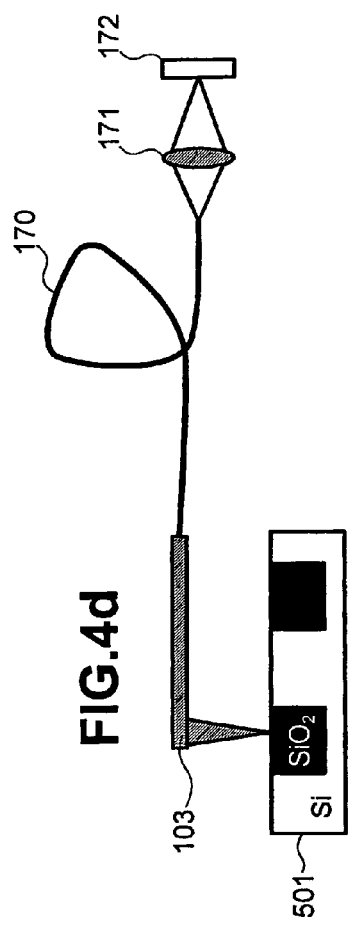

SCANNING PROBE MICROSCOPE AND SPECIMEN OBSERVATION METHOD

This application is a division of application Ser. No. 10/340,517 filed Jan. 9, 2003, now U.S. Pat. No. 6,877,365.

BACKGROUND OF THE INVENTION

1. Field of the Invention

The present invention relates to a scanning probe microscope and specimen observation method and semiconductor device manufacturing method using said scanning probe microscope.

2. Description of the Related Art

An example of known technology for measuring minute three-dimensional shapes is provided by an SPM (scanning probe microscope). This is a widely employed technique whereby minute three-dimensional shapes of the atomic order can be measured, by scanning a sample whilst maintaining the contacting force at an extremely small value while controlling a probe with a sharp tip. Various improvements have previously been made directed at the problem, characteristic of scanning probe microscopes, that it is difficult to raise the speed of physical scanning of the sample.

For example, in Laid-open Japanese Patent Publication Number H. 10-142240 and Laid-open Japanese Patent Publication Number 2000-162115, a technique is disclosed for correcting shape data from both a probe flexure signal and a sample drive signal, in order to obtain both improved speed and better resolution. Also, in Laid-open Japanese Patent Publication Number H. 6-74754, a technique is disclosed of bringing up the probe at high speed whilst vibrating the probe until it is close to the sample, from a location that separated therefrom by about 5 micrometers, by utilizing a construction such that the probe amplitude can be reduced by acoustic interaction when the sample is approached, in order to bring the probe up close to the sample at high speed. However, the above technique is subject to the problem that it can only be employed in a scanning probe microscope of a construction in which the probe is vibrated and to the problem that a further separate sensor must be provided in order to bring the probe up at high speed to a distance of a few micrometers, since proximity cannot be sensed unless the probe is no more than a few micrometers from the sample.

Currently, also, dimension control using a CD-SEM (distance-measurement SEM) is performed in the process of forming a fine pattern on an LSI, but the following restrictions are encountered as the fineness of the pattern is increased. (1) Problem of measurement accuracy: the gate width of a 90-nm node LSI, which is expected to become the most common type in 2003, is 80 nm; assuming that the allowed variability is 10% and that the measurement accuracy is 20% thereof, the required measurement accuracy is 1.6 nm. (2) Demand for profile measurement: the requirement for APC (Advanced Process Control) in order to achieve high-accuracy control of line width is increased, but, in order to achieve this, a technique for measurement of cross-sectional shape, whereby, in addition to pattern line width, electrical characteristics are greatly influenced, becomes necessary. (3) Problem of the subject of measurement: requirement for measurement of materials of low ability to withstand cathode rays, such as DUV (deep ultraviolet) resists, low-k (low permittivity) film materials is increasing. A similar requirement i.e. necessity of the same degree of measurement accuracy and for profile measurement for measurement of resist patterns for master production is anticipated in respect of measurement of the pits of next-generation high-density optical discs.

The above problems cannot be solved by current CD-SEMs. Scanning probe microscopy is considered to be promising in this connection. What is required is a scanning probe microscope whereby, in addition to the improvement in speed of probe approach described above, there is little damage to soft and brittle materials and information regarding the material quality of the surface can be obtained.

In this connection, Laid-open Japanese Patent Publication Number H. 11-352135 discloses a method of reducing damage to soft and brittle materials and to the probe by scanning whilst the probe is cyclically brought up against the sample whilst the sample, or the probe, is vibrated with a fixed amplitude. In addition, Laid-open Japanese Patent Publication Number 2001-33373 discloses a scanning method wherein height measurement is performed with the servo of the probe activated only at separated measurement points, the probe being moved towards the next measurement point in a raised condition. With this method, contact pressure is even smaller and damage to the soft and brittle material and to the probe is small. A further advantage is that faithful measurement of the shape of steps can be performed, since the probe is not dragged over the surface. However, although, when measurement of a pattern such as that of a resist is to be performed, it is desirable to measure the shape of the pattern bottom and, in addition, to obtain by measurement information as to whether any of the resist is left at the bottom, this method was not able to meet these requirements. Also, it is necessary to raise the resonance frequency of the probe and reduce the inertia of the probe in order to achieve higher speeds, and, with this in view, it was necessary to make the cantilever section at the tip of the probe small. However, with the conventional optical lever system, an area of the order of 50 micrometers is necessary in order to ensure and adjust a reflective surface for the laser, so there were limitations to the extent to which improvement in speed could be achieved.

As described above, with the prior art, there were problems concerning increasing the speed of approach of the probe to the sample in order to improve measurement throughput.

SUMMARY OF THE INVENTION

The present invention provides a scanning probe microscope and a specimen observation method using this wherein a high-speed proximity sensor is provided and enabling a high speed of approach of the probe to the sample, by arranging to perform approach of the probe to the sample at high speed by providing the scanning probe microscope with a proximity sensor of high sensitivity having an optical height detection function.

Also, a scanning probe microscope according to the present invention is constituted such that additional information relating to the distribution of material quality on the sample can be obtained without lowering throughput by: applying a voltage to the probe, or measuring the response on vibrating the probe, or detecting the local optical intensity of the sample surface concurrently with obtaining sample height data and concurrently with the contact period with the sample, whilst ensuring that the probe is not dragged over the sample, by bringing the probe into contact with the sample intermittently. In this way, it is made possible to obtain the distribution of additional information, namely, electrical capacitance, elasticity and optical properties in respect of the sample material quality concurrently with the three-dimensional image and without lowering throughput, concurrently with the obtaining of a three-dimensional image using a scanning system with little damage to a brittle sample such as a resist pattern.

Also, according to the present invention, a scanning probe microscope is provided that is easily adjustable and wherein flexure can be detected even with only a small cantilever size of the probe tip, in order to speed up scanning.

Also, according to the present invention, in a scanning probe microscope, accurate measurement of the shape of a step location is made possible by performing scanning with the probe inclined, in respect of sample step locations of steep inclination.

Furthermore, according to the present invention, in a method of manufacturing a material having an ultra-fine structure such as a semiconductor device, stable device fabrication of an ultra-fine structure such as that of a semiconductor device is made possible by observing the semiconductor pattern or the resist pattern using a scanning probe microscope as described above and feeding back the results of this observation to the operating conditions of the process apparatuses.

These and other objects, features and advantages of the invention will be apparent from the following more particular description of preferred embodiments of the invention, as illustrated in the accompanying drawings.

BRIEF DESCRIPTION OF THE DRAWINGS

FIG. 4 is a view showing a method of controlling a probe;

DESCRIPTION OF THE PREFERRED EMBODIMENTS

Figure 1:
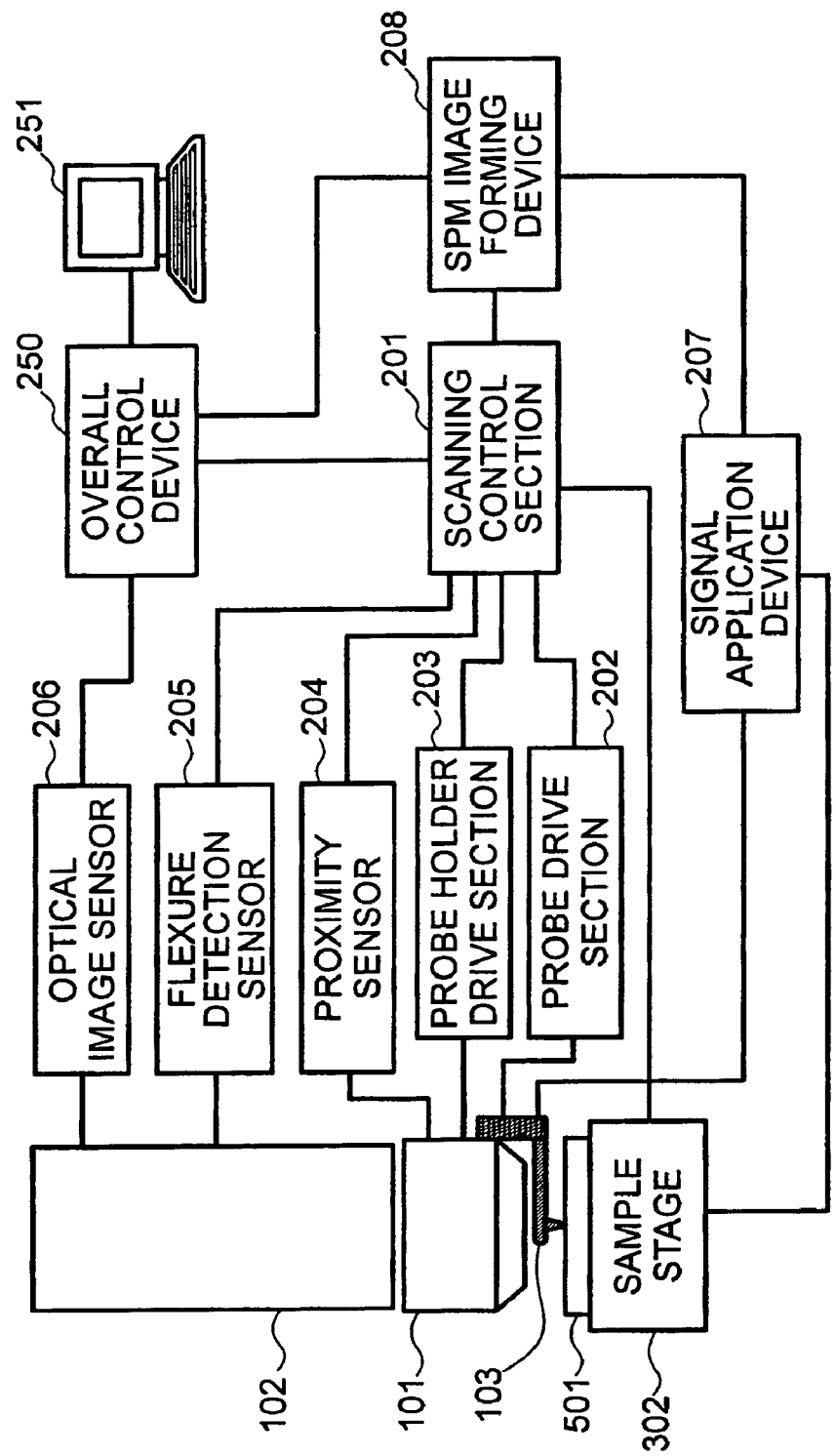
FIG. 1 is a view showing the overall construction of a scanning probe microscope.
Figure 2:
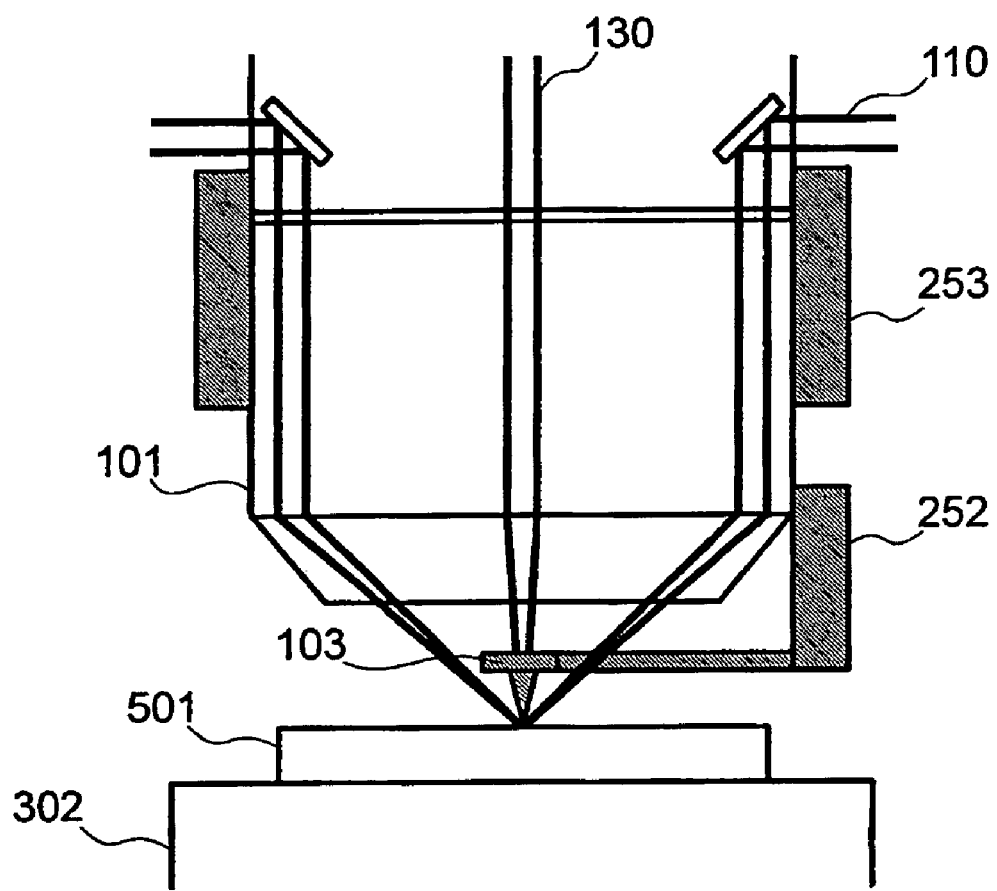
FIG. 2 is a view to a larger scale of an embodiment of the vicinity of the probe.

FIG. 1 is a view showing the construction of a scanning probe microscope according to the present invention. FIG. 2 is a view to a larger scale of an embodiment of the vicinity of the probe. The sample 501 is placed on a sample stage 302 that is capable of being driven in the X, Y and Z directions under the control of a scanning control section 201. Above this there is arranged a probe 103; a probe movement mechanism 252 on which the probe 103 is mounted is driven in the X, Y and Z directions under the control of a probe drive section 202 and probe scanning of the scanning probe microscope is thereby conducted. 252 is mounted on a probe holder 101; the probe holder 101 is mounted in the microscope cylinder 102 by means of a probe holder raising/lowering mechanism 253; coarse movement drive thereof in the Z direction is effected under control of the probe holder drive section 203. The probe movement mechanism 252 is a fine movement mechanism; approach of the probe to the sample is effected by the probe holder raising/lowering mechanism 253 such that the operating distance does not become too large. Alternatively, in another embodiment, approach of the probe to the sample may be effected by driving the sample stage 302. Also, probe scanning of the scanning probe microscope may be effected by driving the sample stage 302.

The proximity sensor 204 is a sensor for measuring with high sensitivity the height in the vicinity of the tip of the probe; approach to the sample can thereby be implemented at high speed without the probe abutting the sample, by controlling the speed of approach by detecting contact of the probe with the sample in advance. As will be described, for the proximity sensor 204, light could be employed. However, any other type of sensor could be employed so long as it has a detection range of at least some tens of micrometers and is capable of detecting the distance to the sample with a sensitivity of the order of one micrometer. For example, an electrostatic capacitative sensor wherein distance is detected by measuring the electrostatic capacitance by applying an AC voltage between the sample holder 101 or the cantilever section of the probe 103 and the sample 501 or an air microsensor in which the pressure of air flowing between the sample holder 101 and the sample 501 is detected may be employed.

The scanning control section 201 effects approach of the probe and scanning of the sample etc by controlling a probe flexure detection sensor 205, the proximity sensor 204, the probe holder drive section 203, the probe drive section 202 and the sample stage 302. During this process, an image of the surface shape of the sample is obtained by sending the signal of the sample during scanning to an SPM image-forming device 208. Also, a signal application device 207 measures the elasticity of the surface by using the flexure detection sensor 205 to detect the response of applying high-frequency vibrations to the probe, or measures the capacitance or resistance by measuring the current obtained on application of AC or DC voltage between the probe and the sample. By performing this at the same time as probe scanning, apart from a surface shape image on the SPM image-forming device 207, an additional image of distribution of properties can be obtained.

If an object lens is incorporated in the probe holder 101, simultaneous observation of the SPM measurement area by obtaining an optical image of the sample by an optical image sensor 206 can be employed in adjustment when mounting the probe 103.

The operation of the device as a whole is controlled by an overall control device 209; acceptance of instructions from the operator and presentation of an optical image or SPM image can be achieved by means of a display/input device 251 thereof.

Figure 3:
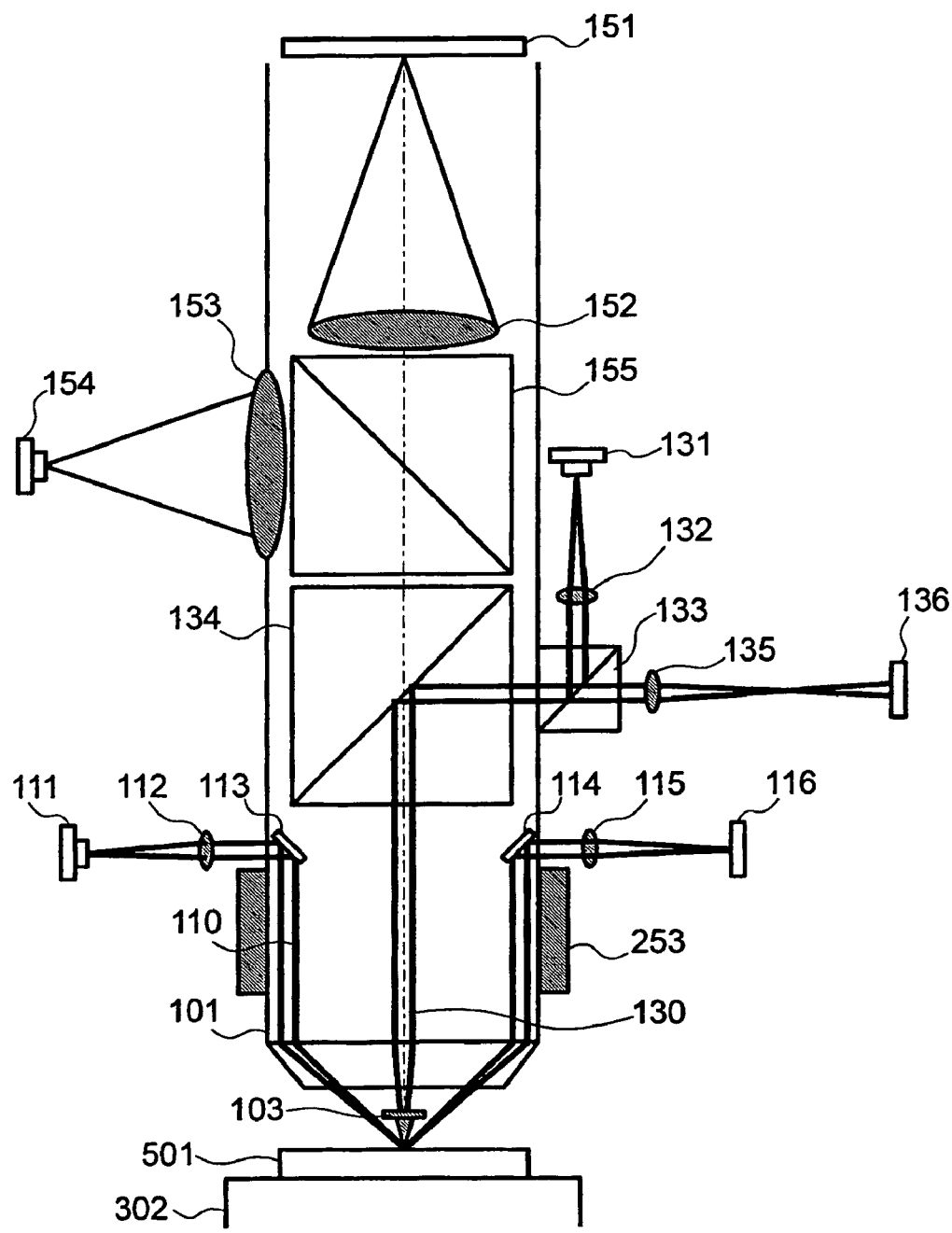
FIG. 3 is a view showing an embodiment of an optical system.

FIG. 3 is a view showing an embodiment of an optical system. Light emitted from a light source 111 is converted to a parallel beam by a lens 112, reflected by a mirror 113, input to an object lens formed within the probe holder 101, and focused on the sample 501. An image of any desired shape, such as a spot or a slit, can be formed by means of the shape of the aperture incorporated in the light source 111. The light reflected by the sample again passes through the object lens, is reflected by a mirror 114, and is imaged on a photodetector 116 by an imaging lens 115. The position of the image is moved in accordance with the height of the sample 501. If the angle of incidence of the detection beam 110 onto the sample is ?, the image magnification factor by the lens 115 is m and the sample height is Z, the amount of this movement is 2mZ tan ?, so the height Z of the sample can be detected if the amount of this movement is measured. Any type of detector 116 that is capable of detecting image position may be employed, such as for example a PSD (position sensitive device), divided photodiode or linear image sensor etc.

Also, although, in the above description, the construction is such that the detection beam 110 passes through the object lens, consideration could be given to a construction in which the detection beam 110 passes outside the object lens and is bent by a further mirror, not shown, before being imaged on the sample. In this case, the lenses 112 and 115 are respectively adjusted such that the light source 111 and the sensor 116 are in an image-forming relationship with the sample 501. The amount of movement of the image on the sensor 116 is then 2mZ sin ?.

The probe flexure detection system will now be described. The light issuing from the light source 131 passes through a lens 132 and a beam splitter and then through a further beam splitter 134 before passing through an object lens whereby it is directed onto the cantilever section of the probe. The light which is reflected thereat returns by the same path, passing through the beam splitter 133 and is directed onto the sensor 136 through the lens 135. The lens 135 is arranged such that the emission pupil of the object lens and the sensor 136 are in an image-forming relationship, so a change in position proportional to the inclination of the reflecting surface of the cantilever is thereby produced in the beam on the sensor 136. It therefore becomes possible to detect the inclination (flexure) of the cantilever by detecting this using a PSD (position sensitive device), divided photo diode or linear image sensor etc arranged at the position of 136.

In addition to flexure, it is also possible to simultaneously detect torsion by employing a two-dimensional PSD, image sensor or photodiode divided into four. In order to separate this detection beam 130 from the beam of the sample observation system, preferably the light source 131 is a monochromatic laser and interference filters are provided before and after the lens 135 so as to permit the passage of this beam only.

Efficiency may be further improved by using a dichroic mirror as the beam splitter 134. Also, if the beam splitter 133 is a polarizing beam splitter and the direction of polarization of the laser 131 is S polarization, which is reflected by 133, and a ¼ wavelength plate (not shown) is arranged between the beam splitters 133 and 134, the S polarized light may be converted to circularly polarized light before striking the reflecting surface of the probe 103 so that, by using a ¼ wavelength plate, the reflected beam therefrom is then again converted to P polarized light which passes through the polarizing beam splitter 133.

In the sample observation system, emission is effected from an illuminating light source 154, passes through a condenser lens 153, is reflected by a beam splitter 155, passes through the beam splitter 134, passes through an object lens within 101 and illuminates the sample 501. The reflected light from the sample again passes through an object lens and is imaged by an imaging lens 152 by passing through the beam splitters 134 and 155 before being detected by an image sensor 151.

Also, as described using FIG. 3, by constituting the probe, sample observation system, sample height sensor and probe flexure detection optical system coaxially, simultaneous observation of the SPM measurement device, facilitation of probe adjustment and high-speed approach of the probe and sample can be achieved. Also, by arranging the probe flexure detection optical system coaxially, it becomes possible to direct a detection beam 130 even onto a probe having a cantilever section of small width, making it possible to employ a probe which is lighter and of higher resonance frequency, thereby enabling the speed of scanning to be increased. By arranging for detection to be effected in all cases through the object lens 101, it becomes possible to make the object lens approach the probe closely, making possible optical observation of the sample with high resolution. Also, an off-axis construction of at least one of the sample height sensor and probe flexure sensor in which light is projected and detected in inclined fashion through the gap between the object lens and the sample, using an object lens of long working distance, may of course be considered.

Also, as another construction, a method may be considered in which flexure of the probe 103 is detected using a heterodyne interference method. A point light source of frequency fo and a point light source of frequency fo+f obtained by shifting this frequency by a frequency f are arranged at the position of the light source 131. Provision of a point light source may be achieved by restricting the width of a laser beam by using a lens or by arranging the emission terminal of an optical fiber at this point. The optical system is adjusted so as to form this image at two points on the probe 103.

Figure 9:
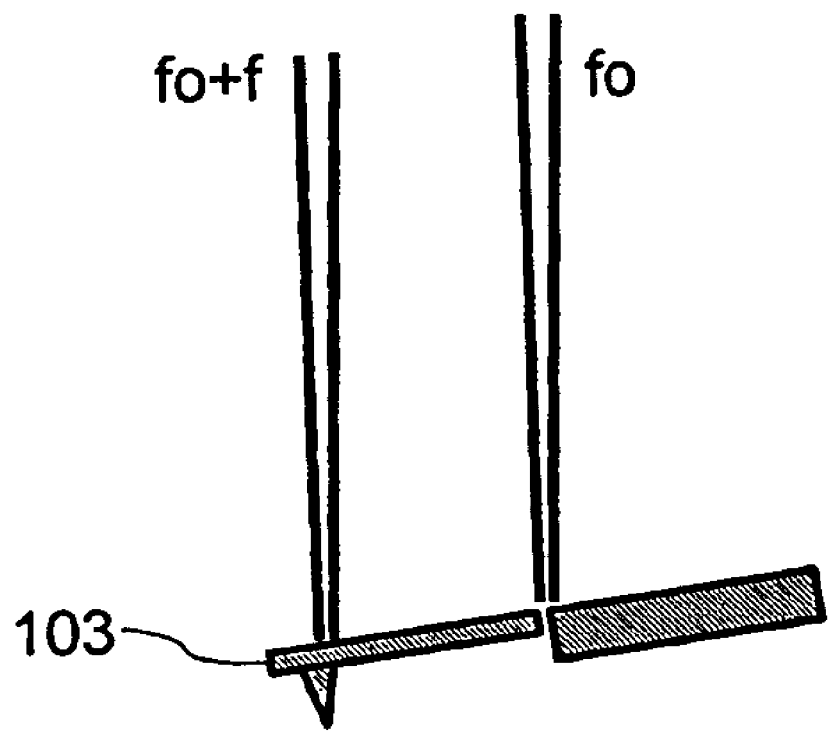
FIG. 9 is a view showing the principles of measurement of probe flexure by heterodyne interference.

As shown in FIG. 9, one of the images is formed at the tip of the cantilever section of the probe while the other image is formed at the root thereof; their reflected beams intersect at a position 136, so if a photodiode is placed at 136, beats of frequency f are generated by interference of these two beams. When this beat signal is subjected to lock-in detection, taking as reference the frequency f that is applied to the frequency shifter, and the phase thereof is found, the change in phase thereof i.e. the change of inclination of the cantilever is obtained. The flexure of the cantilever can thereby be detected. Alternatively, instead of the signal that is applied to the frequency shifter, light transmitted by the beam splitter 133 without reflection after passing through the lens 132 may be detected by a further photodiode (not shown) at the location where the two beams cross and taken as the reference signal of frequency f.

Also, in another construction, a sensor whereby a signal is obtained that reflects changes of strain, such as a strain gauge, may be incorporated in the probe and employed instead of the optical flexure sensor.

Figure 8:
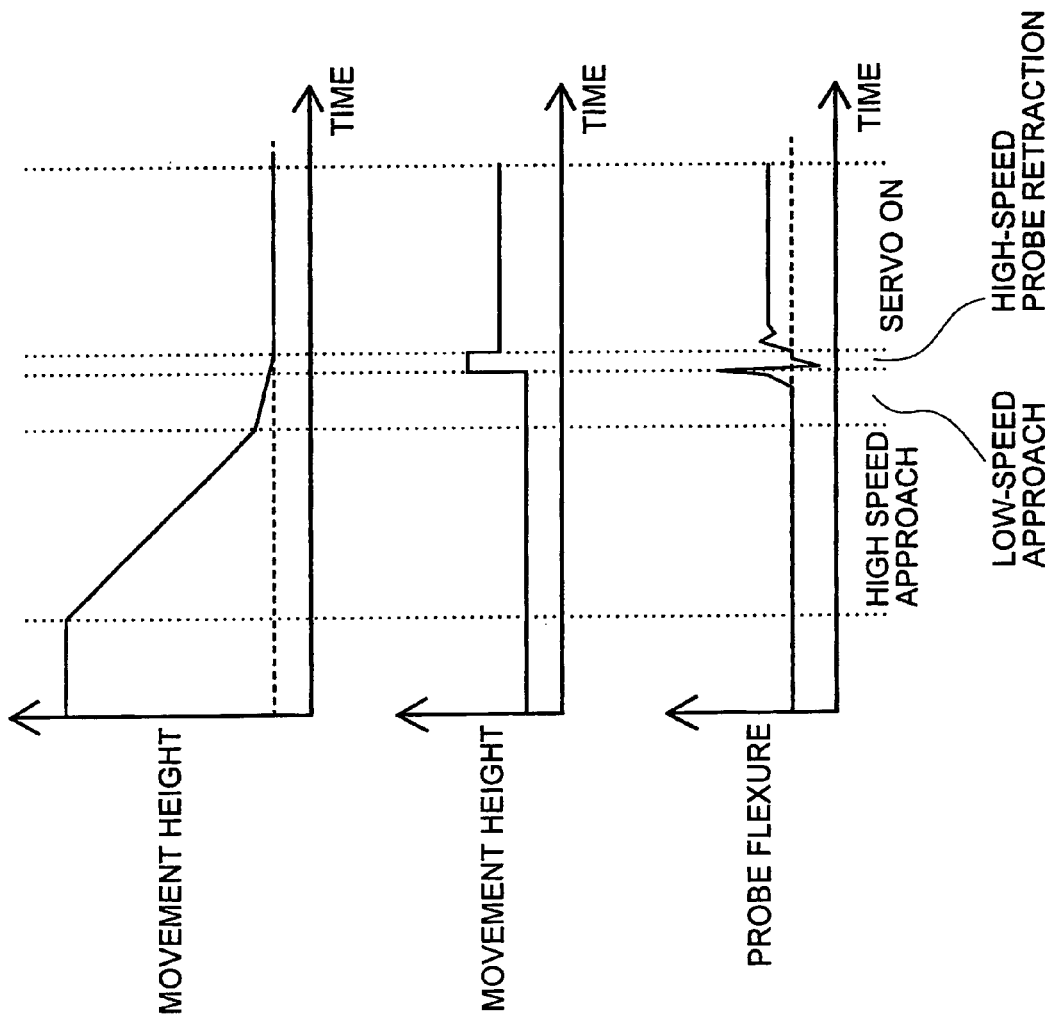
FIG. 8 is a view showing a method of high-speed approach control of the probe-sample distance.

High-speed approach control of the probe and the sample employing a sample height sensor according to the present invention is described below with reference to FIG. 8. First of all, the probe micro-movement mechanism (probe movement mechanism 252) is put in extended condition (condition in which the probe micro-movement height is low). Next, the probe coarse movement mechanism (probe holder raising/lowering mechanism 253) lowers the probe (lowers the probe coarse movement height) at high speed (of the order of 1 to 10 mm/s) whilst the sample height sensor 204 is monitored. When the output of the sample height sensor 204 has become 10 to a few tens of micrometers, a changeover to low-speed approach is effected (of the order of 0.1 mm/s). The output of the probe flexure detection sensor 205 is monitored and, at the point where this starts to become large, the probe micro-movement mechanism is straightaway retracted (high-speed probe retraction in FIG. 8).

Compared with the method that is ordinarily carried out, in which approach is performed with the probe put in the SPM servo mode, in which it is difficult to raise the speed during low-speed approach owing to the restriction to the zone of probe control, this has the advantage that the speed of low-speed approach is raised by straightaway retracting the probe at the instant where contact is sensed, without putting the probe into the servo mode. After this, after high-speed probe retraction has been performed, the servo is turned ON and the probe is slowly brought into contacting condition with respect to the sample. Although the foregoing description has been given under the assumption that the probe side is driven, it of course applies in the same way in the case where probe approach is effected by driving the sample stage 302.

Next, a probe scanning mode applied to measurement of a sample of soft brittle material having a high aspect ratio, such as a resist pattern, is described with reference to FIG. 4. The sample height, exclusively at discrete measurement points, is then measured by repeating the operation of turning on the servo (Tc interval) such as to provide a fixed contact pressure (i.e. probe flexure), by raising and lowering the probe, as shown in (b), whilst changing the relative position of the sample and the probe in the horizontal direction. The repetition period is Ts. In this way, since the probe is not dragged over the sample, there is little damage to the sample and probe scanning can be implemented whereby the shape can be faithfully measured even at step locations. This itself is a method which is disclosed in Laid-open Japanese Patent Publication Number 2001-33373 etc, but the following invention is described as an embodiment applied to measurement of for example resist patterns.

Figure 5:
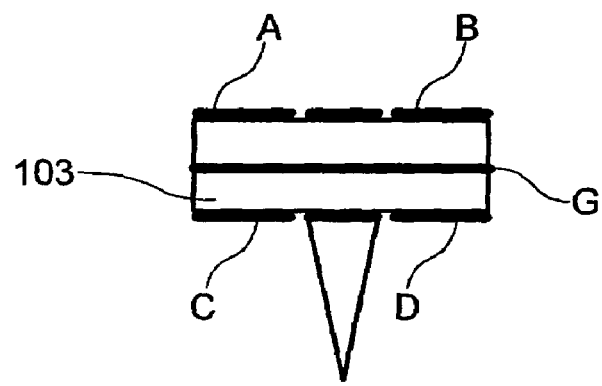
FIG. 5 is a view showing the construction of a cantilever capable of controlling the inclination of the probe.

The probe tip has a certain taper angle, so conventionally it was not possible to measure accurately with a scanning probe microscope the shape of a step location elevated therefrom; however, when a step is detected, scanning is arranged to be performed with the probe inclined as shown by the dotted line in (a). As methods of inclining the probe, methods are available in which the probe holder is provided with a micro-rotation mechanism; however, there is also available the method of employing a piezoelectric thin film type cantilever, as shown in FIG. 5, as disclosed in "T. R. Albrecht, S. Akamine, M. J. Zdeblick, C. F. Quate, J. Vac. Sci. Technol. A8 (1), 317 (Januay/February, 1990)". This is of a so-called bi-morph construction, in which piezoelectric elements are provided above and below an intermediate electrode G, while electrodes A, B, C, D are formed on the opposite side thereof. With this construction, the probe can be inclined by generating torsional deformation when a voltage change is applied in opposite directions to A–G, D–G and B–G, C–G. Torsion of the probe can be easily detected by employing a 4-sector divided photodiode for the probe flexure detector 136.

In addition, in resist pattern measurement, there is a considerable need to detect whether any resist is left at the bottom of a resist pattern. Also, in recent years semiconductors with flat structure have become common and the need to ascertain the material quality boundary in respect of patterns in which surface irregularity has been eliminated by grinding has increased. In order to meet these needs, concurrently with the measurement of the shape of three-dimensional surfaces, techniques for measuring the distribution of surface capacitance, optical characteristics and mechanical properties such as elasticity are required.

With the scanning system described in FIG. 4(*b*), there is an interval Tc in each measurement period Ts in which the probe is in contact with the sample surface, so measurements of the distributions of various physical properties can be performed concurrently with that of the image of the surface shape by performing measurements of these various surface physical properties in synchronization with these intervals. FIG. 4(*c*) is an embodiment in which measurement of local capacitance is performed by synchronized detection of the current that flows when an AC voltage is applied between the probe and the sample. Also, FIG. 4(*d*) is an embodiment in which the distribution of local optical properties of the sample is found by making the interior of the probe capable of transmitting light, illuminating the sample and guiding the light from the tip of the probe to an optical fiber 170 and thence, through a lens 171, to a sensor 172 that detects the amount of light in the interval Tc. In this way, observation/measurement can be conducted even in respect of a sample wherein for example silicon oxide is buried in silicon, as shown in FIGS. 4(*c*) and (*d*) and the surface rendered flat by grinding.

Figure 6:
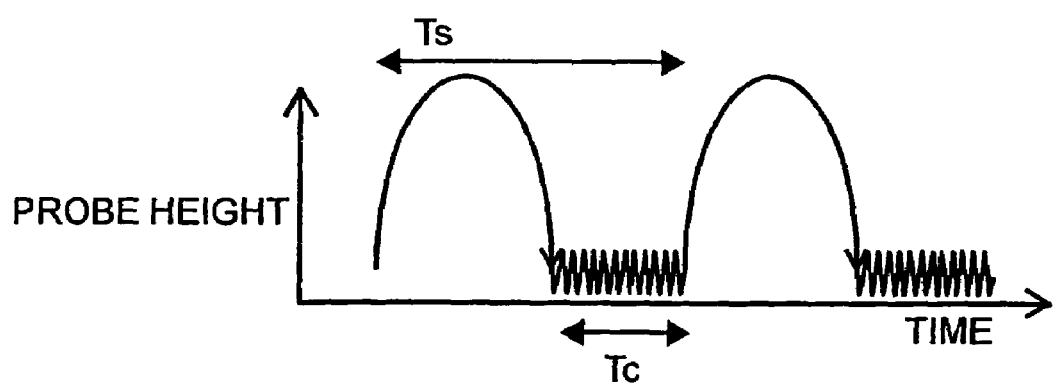
FIG. 6 is a view showing a condition in which the probe is vibrated during the period of contact of the sample and the probe.

FIG. 6 shows an embodiment in which the probe is subjected to micro-vibration with period T in the interval Tc. It will be assumed that T is considerably smaller than Ts or Tc. The distribution of local mechanical properties of the sample surface can be obtained by obtaining a probe flexure signal and performing synchronized detection on this applied input vibration signal to find the amplitude and phase thereof. It is also possible to find the distribution of local optical properties of the sample by illuminating the probe tip and conducting detection synchronized with probe vibration by detecting only scattered light at the tip or by detecting light brought to convergence by the optical system, as shown in FIG. 4(*d*).

Figure 7:
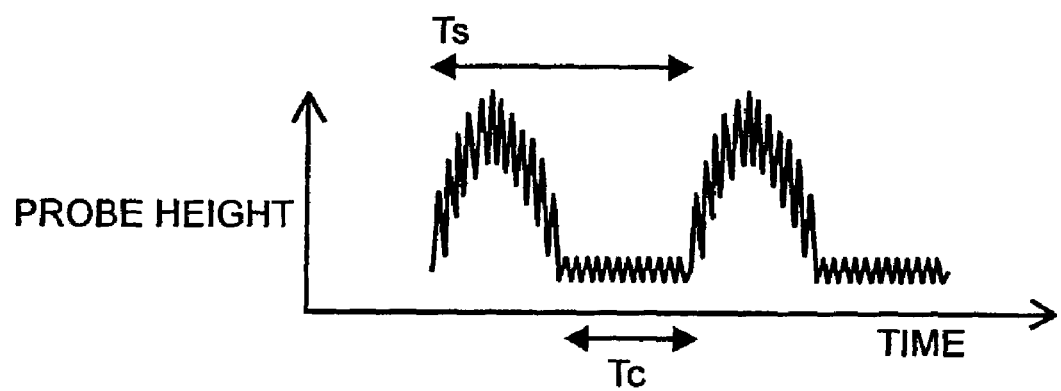
FIG. 7 is a view showing how measurement of sample height is performed, whilst high-frequency micro-vibrations are constantly being applied, with a period Tc that is considerably slower than the frequency of these micro-vibrations.

Alternatively, as shown in FIG. 7, it is also possible to detect the height of the sample by constantly applying vibration of period T (where T<<Tc) to the probe and detecting reduction of the amplitude resulting from contact of the probe with the sample.

Figure 10A:
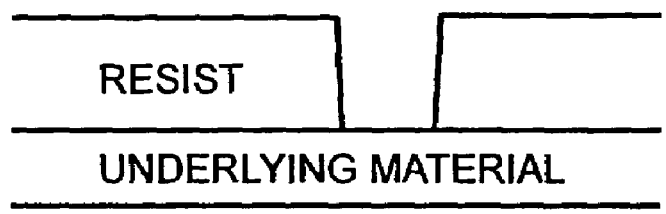
FIG. 10 is a view showing an example of a resist pattern that can be identified in accordance with the present invention.
Figure 10B:
Figure 10C:
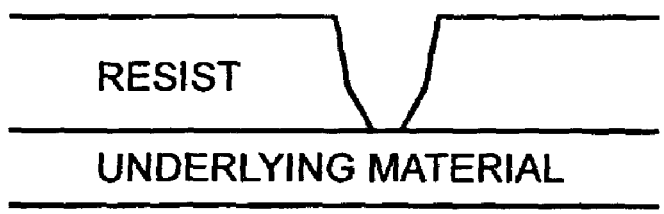

Next, an example of measurement of a resist pattern will be described using FIG. 10. In the measurement of a resist pattern, is necessary to distinguish whether the pattern has been broken vertically, as in (a), whether a thin resist layer has been left behind, as in (b), or whether the bottom portions of the grooves or holes have been reduced in width, as in (c). These can be distinguished according to the present invention.

Figure 11:
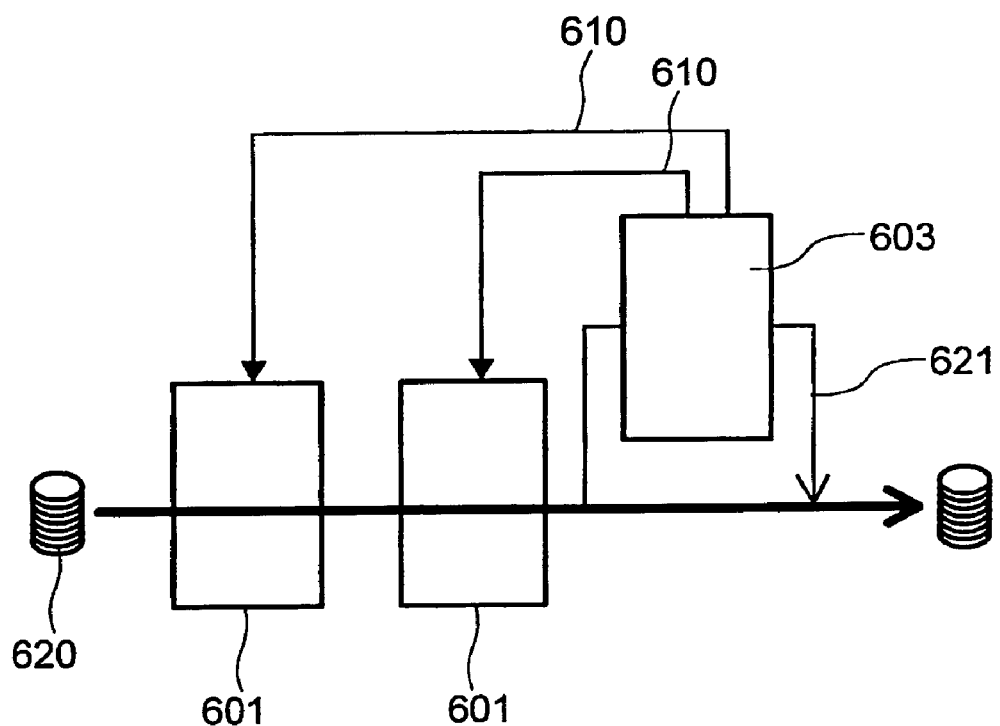
FIG. 11 is a view showing an example of an embodiment in which process condition control of a semiconductor is performed in accordance with the present invention.

In addition, a method of device fabrication using the present invention is shown in FIG. 11. Devices are formed by feeding wafers 620 to process apparatuses 601, 601'. The process apparatuses 601, 601' may be, depending on the case, etchers, CMP apparatuses, exposure apparatuses or developing apparatuses. The scanning probe microscope 603 according to the present invention is used to observe/measure the patterns formed on wafers, using wafers extracted from the process steps or dummy wafers 621. Alternatively, with large throughput, all of the wafers may be subjected to observation/measurement by the scanning probe microscope 603 according to the present invention.

Since, with the present invention, the distribution of surface conditions and/or three-dimensional shape of the pattern can be observed/measured accurately without damaging the sample, fabrication of devices of high precision in a stable fashion can be achieved by feeding back the observation/measurement results to the process conditions of the process apparatuses 601, 601'. Depending on the situation, a special-purpose data processing server may be interposed in the feedback path 610.

Processing can also be performed by feeding the data obtained by observation/measurement with the scanning probe microscope 603 according to the present invention through a circuit to another data processing device, when they are combined with data obtained by other inspection/observation/analysis apparatuses. For example, by combining and analyzing the data obtained by observation/measurement with the scanning probe microscope 603 of the present invention with sample analysis data obtained by another analysis apparatus, more detailed information such as the two-dimensional or three-dimensional distribution of defects or composition of the sample surface may be obtained.

According to the present invention, measurement throughput may be improved since high-speed approach of the sample and probe can be achieved by the provision of a high-sensitivity proximity sensor.

Also, according to the present invention, additional information relating to the distribution of material quality on the sample is obtained without lowering of throughput, concurrently with obtaining sample height data, whilst ensuring that the probe is not dragged over the sample by bringing the probe into contact with the sample intermittently.

Also, according to the present invention, in regard to sample step locations of steep inclination, accurate measurement of shape at step locations can be achieved by performing scanning with the probe inclined.

Also, according to the present invention, high-precision device fabrication can be achieved in stable fashion, since the semiconductor pattern can be measured with high throughput.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A scanning probe microscope comprising:
   a sample stage on which a sample is placed;
   a probe configured to measure a surface distribution and/or a three-dimensional surface shape of said sample placed on said sample stage;
   a drive section configured to control distance between said sample stage and said probe; and
   a sensor configured to measure a contact condition of said probe and said sample;
   wherein when a steep step is detected, said probe is inclined towards a sidewall of said steep step of said sample to measure said three-dimensional surface shape of said sample, said probe thereby maintaining contact with said sidewall.

2. The scanning probe microscope according to claim 1 further comprising a micro-rotation mechanism operatively coupled to said probe, wherein said probe is inclined by said micro-rotation mechanism.

3. The scanning probe microscope according to claim 1 further comprising piezoelectric elements operatively coupled to said probe, wherein said probe is inclined by applying a signal to said piezoelectric elements.

4. A scanning probe microscope comprising:
   a sample stage on which a sample is placed;
   a probe configured to measure a surface distribution and/or a three-dimensional surface shape of said sample placed on said sample stage;
   a drive section configured to control distance between said sample stage and said probe; and
   a sensor configured to measure a contact condition of said probe and said sample,
   wherein said probe is configured to be inclined towards a sidewall of a steep step of said sample to measure said three-dimensional surface shape of said sample, said probe thereby maintaining contact with said sidewall, said probe configured to vary an angle of inclination of said probe towards said sidewall during scanning of said steep step of said sample,
   wherein said drive section has a scanning mode in which a height of said sample is measured by cyclically raising said probe and lowering said probe at a next measurement point,
   wherein measurement of said three-dimensional surface shape distribution and measurement of at least one mechanical, optical, or electrical characteristic of said sample is performed when said probe is in contact with said sample.

5. The scanning probe microscope according to claim 4, wherein said measurement of electrical characteristics is performed by detecting a synchronized current that flows when an AC voltage is applied between said probe and said sample.

6. The scanning probe microscope according to claim 4, wherein said measurement of optical characteristics is performed by making an interior of the probe capable of transmitting light, illuminating said sample, guiding said light from a tip of said probe to an optical fiber to a sensor that detects amount of said light.

7. A method of observing a sample comprising:
   performing a scanning operation in which a height of said sample is measured by cyclically raising a probe and lowering said probe during said scanning operation;
   detecting a sidewall having a steep step of said sample;
   in response to detecting said sidewall, changing an inclination of said probe so that said probe maintains contact with said sidewall.

8. The method according to claim 7 further comprising:
   measuring at least one mechanical, optical, or electrical characteristic of said sample when said probe is in contact with said sample.

* * * * *